United States Patent
Reddy et al.

(10) Patent No.: US 9,843,505 B2
(45) Date of Patent: Dec. 12, 2017

(54) DIFFERENTIATED QUALITY OF SERVICE USING TUNNELS WITH SECURITY AS A SERVICE

(71) Applicant: CISCO TECHNOLOGY, INC., San Jose, CA (US)

(72) Inventors: K. Tirumaleswar Reddy, Bangalore (IN); Prashanth Patil, Mountain View, CA (US); Daniel G. Wing, San Jose, CA (US); Ram Mohan Ravindranath, Bangalore (IN); William C. VerSteeg, Buford, GA (US); Charles U. Eckel, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 14/724,635

(22) Filed: May 28, 2015

(65) Prior Publication Data

US 2016/0352628 A1 Dec. 1, 2016

(51) Int. Cl.
*H04L 12/721* (2013.01)
*H04L 12/851* (2013.01)
*H04L 12/46* (2006.01)
*H04L 29/06* (2006.01)
*H04L 12/725* (2013.01)

(52) U.S. Cl.
CPC .......... *H04L 45/38* (2013.01); *H04L 12/4633* (2013.01); *H04L 45/302* (2013.01)

(58) Field of Classification Search
USPC ................ 709/225, 218, 223, 227, 203, 202
See application file for complete search history.

(56) References Cited

U.S. PATENT DOCUMENTS

| | | | | |
|---|---|---|---|---|
| 7,685,292 B1 * | 3/2010 | Kinsella | .............. | H04L 12/4633 709/223 |
| 7,995,571 B2 * | 8/2011 | Park | .................... | H04L 12/4633 370/389 |
| 9,356,866 B1 * | 5/2016 | Sivaramakrishnan | ........................... | H04L 45/7453 |

(Continued)

OTHER PUBLICATIONS

Eckel, et al., "Application Enabled Open Networking Use Cases," Internet Engineering Task Force, Jan. 8, 2014, 11 pages; https://tools.ietf.org/html/draft-eckel-aeon-use-cases-00#ref-I-D.eckert-intarea-flow-metadata-framework.

(Continued)

*Primary Examiner* — Jude Jean Gilles

(57) ABSTRACT

A computer-implemented method includes sending a first request message to a first server associated with a first access network indicative of a request for an indication of whether the first server is configured to support prioritization of tunneled traffic, receiving a first response message from the first server indicative of whether the first server is configured to support prioritization of tunneled traffic, establishing one or more first tunnels with a security service when the first response message is indicative that the first server is configured to support prioritization of tunneled traffic, sending first flow characteristics and a first tunnel identifier to the first server; and receiving the first flow characteristics for each first tunnel from the first server at a first network controller. The first network controller is configured to apply a quality of service policy within the first access network for each tunnel in accordance with the flow characteristics.

23 Claims, 10 Drawing Sheets

(56) References Cited

U.S. PATENT DOCUMENTS

| | | | |
|---|---|---|---|
| 2010/0103875 A1* | 4/2010 | Simonsson | H04W 76/022 370/328 |
| 2010/0172302 A1* | 7/2010 | Dunk | H04L 12/4633 370/328 |
| 2011/0137809 A1* | 6/2011 | Klapheke | G06Q 10/00 705/304 |
| 2013/0058345 A1* | 3/2013 | Kano | H04L 12/4633 370/392 |
| 2014/0029436 A1* | 1/2014 | Boc | H04W 8/082 370/236 |
| 2014/0341109 A1* | 11/2014 | Cartmell | H04L 45/308 370/328 |
| 2015/0043350 A1* | 2/2015 | Basilier | H04L 63/0272 370/235 |
| 2015/0067819 A1* | 3/2015 | Shribman | H04L 67/06 726/12 |
| 2015/0180769 A1* | 6/2015 | Wang | H04L 45/38 370/236 |

OTHER PUBLICATIONS

Wing, et al., "PCP Flowdata Option," PCP Working Group, Jul. 3, 2013, 16 pages.

* cited by examiner

DIFFERENTIATED QUALITY OF SERVICE USING TUNNELS WITH SECURITY AS A SERVICE

TECHNICAL FIELD

The present disclosure relates generally to system and method of providing differentiated quality of service in a telecommunications network.

BACKGROUND

There is a finite amount of fiber infrastructure to support telecommunications networks. With more devices being added to the networks, whether connected wired or wirelessly, more applications compete for resources within the networks. As a result, the telecommunications networks (e.g., access networks) often don't have sufficient bandwidth or other characteristics to allow some applications to function as desired. Also, access networks that handle network flows may not always be equipped to identify different types of network flows in the networks. Thus, the quality of service in wireless and wired access networks is often constrained. Therefore, it's a challenge to provide quality of service that warrants differentiated treatments for network flows in an access network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAIL DESCRIPTION

Overview

Figure 1:
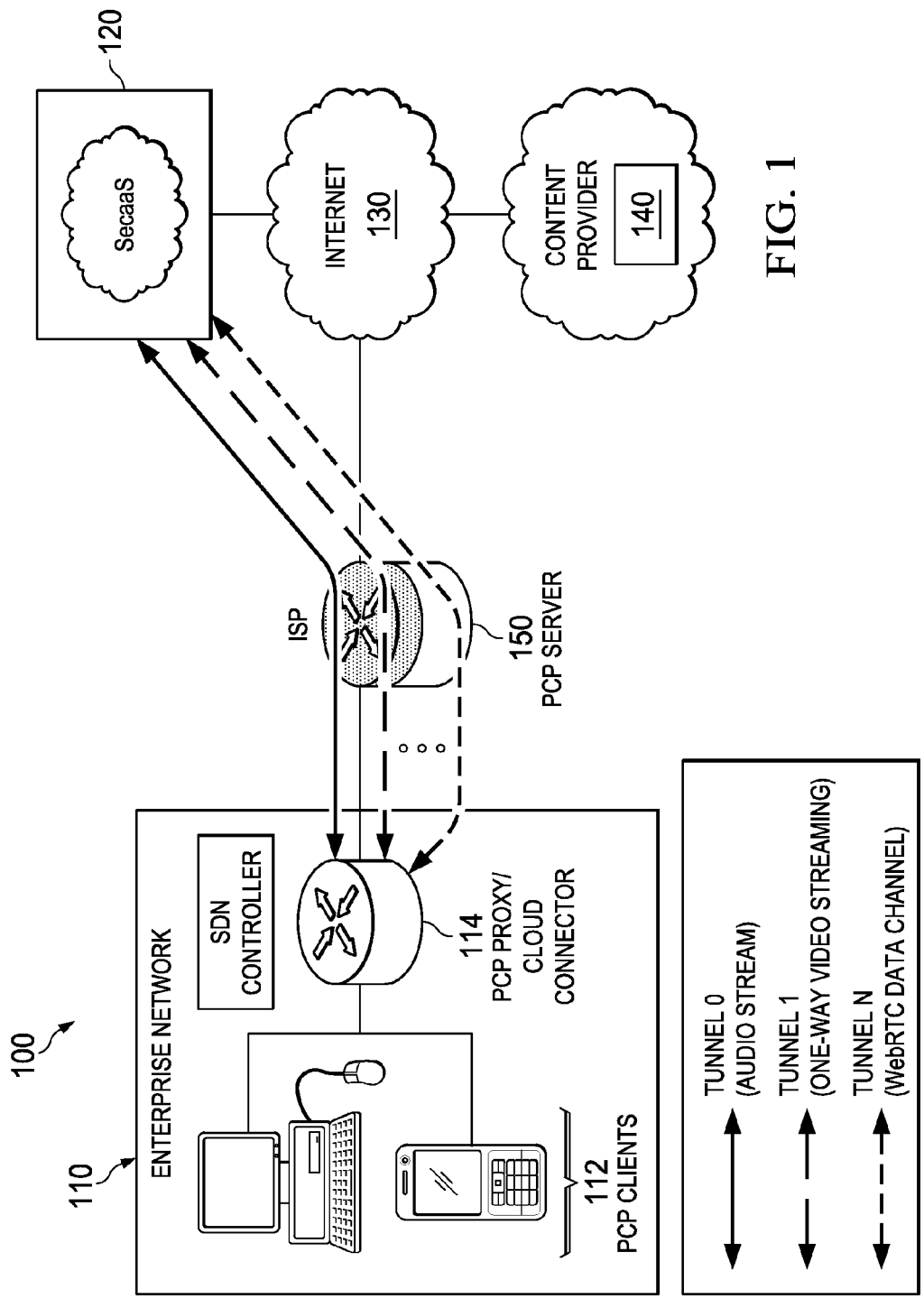
FIG. 1 illustrates an example system for providing differentiated quality of services using tunnels with security as a service in a telecommunications network in accordance with various embodiments.

A computer-implemented method according to one example embodiment comprises sending a first request message to a first server associated with a first access network, the first request message indicative of a request for an indication of whether the first server is configured to support prioritization of tunneled traffic; receiving a first response message from the first server, the first response message indicative of whether the first server is configured to support prioritization of tunneled traffic; establishing one or more first tunnels with a security service when the first response message is indicative that the first server is configured to support prioritization of tunneled traffic, each first tunnel having priority information associated therewith; sending first flow characteristics and a first tunnel identifier to the first server; and receiving the first flow characteristics for each first tunnel from the first server at a first network controller, the first network controller configured to apply a quality of service (QoS) policy within the first access network for each tunnel in accordance with the flow characteristics.

In a particular embodiment, the computer-implemented method of claim 1, further includes receiving traffic associated with a content session established between a client device and a content provider; receiving a result of classifying the traffic according to required flow characteristics received from the client device; and routing the classified traffic over a selected one of the one or more tunnels having the required flow characteristics.

In another particular embodiment, the first request message includes a port control protocol (PCP) proxy probe message. In still another particular embodiment the first server is a port control protocol (PCP) server. In still another particular embodiment, the tunnel identifier is an Internet Protocol Security (IPsec) Security Parameter Index (SPI).

In another particular embodiment, the first network controller includes a software-defined networking (SDN) controller. In still another particular embodiment, the first network controller is configured to apply the quality of service policy within the first access network for each tunnel by configuring one or more network devices within the first access network to apply the QoS policy for each tunnel. In still another particular embodiment, the one or more network devices includes at least one of a router and a switch.

In another particular embodiment, the first request message is sent by at least one of a proxy within the first access network and a client device connected to the first network. In still another particular embodiment, the first access network is a Wi-Fi access network.

In another particular embodiment, the computer-implemented method further comprises: sending a second request message to a second server associated with a second access network, the second request message indicative of a request for an indication of whether the second server is configured to support prioritization of tunneled traffic; receiving a second response message from the second server, the second response message indicative of whether the second server is configured to support prioritization of tunneled traffic; and establishing one or more second tunnels with the security service when the second response message is indicative that the second server is configured to support prioritization of tunneled traffic, each second tunnel having priority information associated therewith.

In another particular embodiment, the computer-implemented method further comprises: sending second flow characteristics and a second tunnel identifier for each second tunnel through the second server; and receiving the second flow characteristics for each second tunnel from the second server at a second network controller, the second network controller configured to apply a quality of service (QoS) policy within the second access network for each second tunnel in accordance with the flow characteristics.

In another particular embodiment, the one or more second tunnels are established using a Mobility and Multihoming (MOBIKE) Protocol using Internet Key Exchange (IKE). In still another particular embodiment, the second access network includes a mobile network.

A system according to one embodiment comprises at least one processor; and memory including instructions that, when executed by the at least one processor, cause the system to: send a first request message to a first server associated with a first access network, the first request message indicative of a request for an indication of whether the first server is configured to support prioritization of tunneled traffic; receive a first response message from the first server, the first response message indicative of whether the first server is configured to support prioritization of tunneled traffic; establish one or more tunnels with a security service when the first response message is indicative that the first server is configured to support prioritization of tunneled traffic, each first access network tunnel having priority information associated therewith; send first flow characteristics and a first tunnel identifier for each first tunnel to the first server; and receive the first flow characteristics for each first tunnel from the first server at a first network controller, the first network controller configured to apply a quality of service (QoS) policy within the first access network for each tunnel in accordance with the flow characteristics.

Example Embodiments

Systems and methods in accordance with various embodiments of the present disclosure provide for prioritizing tunneled network flows and providing differentiated quality of service accordingly. More specifically, various embodiments of the present disclosure provide methods to signal flow characteristics of one or more tunneled network flows to a Security as a Service (SecaaS) from a cloud connector so that a network hosting the cloud connector can provide differentiated quality of service based upon the flow characteristics of one or more network flows.

Access networks often have insufficient bandwidth or other characteristics that prevent some applications from functioning as well as desired. Although the quality of wireless and wired access networks continues to improve, those access networks are often constrained for various reasons. Applicant-Enabled Open Networking (AEON) provides a mechanism to signal an application's network requirements to the access network, so that certain network flows can receive service that is differentiated from other network flows. With this mechanism, a host can request that the network provide certain characteristics for a flow in both the upstream and downstream directions. The network authorizes the request and signals back to the host that it can (fully or partially) accommodate the flow. This sort of signaling is useful for long-lived flows such as interactive audio/video, streaming video, and network control traffic (call signaling, routing protocols). In some instances, a host describes the flow characteristics to the network and the network indicates its ability or inability to accommodate the flow.

In many instances, a cloud connector (e.g., Cisco Cloud web security connector) that is hosted on the Enterprise network premises redirects network traffic (e.g., HTTP(s)/FTP/SMTP) to the SecaaS for inspection. The SecaaS can perform inspection (e.g., application and protocol detection, deep packet inspection (DPI), or heuristics) to detect malware, exploit scripts, or detect data leakage of the one or more network flows. The network flow is a 5-tuple identified by source IP address, destination IP address, protocol number, source port number, and destination port number. The flow characteristics may include upstream and downstream bandwidth, jitter, delay, loss, or class of service. In some embodiments, a SecaaS is configured to identify one or more specific types of network flows, such as long-lived network flows (e.g., a streaming video) that have specific flow characteristics. Some embodiments enable the cloud connector to act as a PCP client to signal received flow characteristics of one or more network flows to an upstream PCP server hosted by the Internet service provider (ISP).

In some embodiments, services provided by a SecaaS include, but are not limited to, authentication, anti-virus, anti-malware/spyware, intrusion detection, and security event management. The services can be provided to users either as a service on demand, through a subscription, in a "pay-as-you-go" model, or at no charge.

Multiple SecaaS vendors are beginning to offer tunnel based solutions in place of plain redirection, the idea being that web traffic is redirected to the SecaaS cloud service via tunnels. Since tunnels carry all traffic within a single channel, providing prioritization for individual flows is not possible because flow granularity is lost at the access network. In accordance with various embodiments, multiple prioritized tunnels setup between the connector and the cloud service are used. The connector classifies traffic based on flow characteristics received from the host and/or client or by some classification logic of its own, and routes them over one of the appropriate tunnels. The number of tunnels to be setup and priority of each tunnel are negotiated between the connector and the cloud service at the time of registration. The connector, since it is aware of the tunnel priority, conveys the flow characteristics to the PCP server in the access network for the entire tunnel using a protocol such as PCP. The access network is then capable of prioritizing tunnels appropriately.

In some embodiments, if specific flow characteristics are identified, a SecaaS signals the flow characteristics of identified network flows to a connector so that a network hosting the connector can provide differentiated quality of service to the identified tunneled network flows. For network flows with other types of flow characteristics, the SecaaS may refrain from signaling to the connector so that the connector is not overwhelmed with flow characteristics of the other types of network flows (e.g., short-lived network flows).

In typical deployments with cloud connectors re-directing HTTP(S) traffic to SecaaS using a tunneling approach, access networks lose flow granularity and are hence not typically in any position to prioritize selected HTTP(s) flows. For example, an access network cannot typically prioritize one-way video streaming content from a content delivery network (CDN). In many typical deployments of SecaaS, the cloud connector is co-located with a firewall. In certain environments, restrictive firewall policies block all outgoing traffic except for TCP traffic to port 80 for HTTP or 443 for HTTPS. In such scenarios, media streams (e.g., audio, video), and P2P traffic (e.g., Bittorrent) could be sent on HTTP(S) ports. For example if all other ports are blocked then Skype uses HTTP(S) ports for media streams. Bittorrent also uses HTTP(S) ports to download/upload files if all other ports are blocked.

FIG. 1 illustrates a communication system 100 for providing differentiated quality of service using tunnels with security as a service in a telecommunications network in accordance with one embodiment. In this example, the system 100 includes an enterprise network 110, which includes a Port Control Protocol (PCP) proxy and cloud connector 114. The PCP proxy/cloud connector 114 is coupled to PCP clients 112 in the enterprise network 110. Although the illustrated embodiment shows PCP clients 112 as a cell phone and a computer in FIG. 1, various types of electronic or computing devices that are capable of sending a request or receiving content may be used. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these. In other embodiments, one or more of PCP clients 112 may be part of a PSTN Gateway or other gateway that connections VOIP networks with PSTN. In still other embodiments, one or more of PCP clients 112 may also be part of a Session Border Controller (SBC) for cases in which an SBC is acting as a PCP client on behalf of endpoints. The computing device may use operating systems that include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

The PCP proxy/cloud connector 114 is coupled to a SecaaS 120 via the Internet 130. The SecaaS 120 is a network-based security service configured to perform security functions upon data traffic such as detect malware, detect data leakage, and/or exploit scripts by performing application and protocol detection, DPI, or heuristics. Depending on the desired implementation in the system 100, a variety of networking and messaging protocols may be used, including but not limited to TCP/IP, open systems interconnection (OSI), file transfer protocol (FTP), universal plug and play (UPnP), network file system (NFS), common internet file system (CIFS), AppleTalk etc. As would be appreciated by those skilled in the art, the system 100 illustrated in FIG. 1 is used for purposes of explanation, a network system may be implemented with many variations, as appropriate, in the configuration of the cloud connector and client devices in accordance with various embodiments of the present disclosure.

In some embodiments, the PCP proxy/cloud connector 114 includes a PCP proxy function that operates as a PCP Proxy to facilitate communication between PCP client 112 and upstream PCP server(s) 150 hosted by an ISP policy application. The PCP Proxy function may act as a PCP server receiving PCP requests on internal interfaces, and as a PCP client forward accepted PCP requests on an external interface to PCP server 150. The PCP Proxy function relays PCP requests received from the PCP clients 112 to the one or more upstream PCP servers 150. The PCP Proxy function may help to establish successful PCP communications for the PCP clients 112, which cannot be configured with the address of a PCP server, located more than one hop away. In this example, the PCP proxy/cloud connector 114 signals the flow characteristics of the particular network flow to PCP Server 150. In response to the PCP request from the PCP Client 114, the PCP Server 150 sends PCP responses to the PCP client 112.

In some instances, the address of the PCP proxy/cloud connector 114 is provisioned to PCP clients 112 as the default PCP server. If the PCP DHCP (Dynamic Host Configuration Protocol) option is supported by an internal PCP client, the PCP server IP address can be retrieved from a local DHCP server. If the PCP DHCP option is not supported, internal PCP clients can assume their default router as being the PCP server.

In some embodiments, the PCP proxy/cloud connector 114 may handle multiple PCP Servers 150 and/or multiple SecaaS 120 at the same time. The hosts 112 do not need to be aware of the presence of the multiple PCP Servers 150 and/or multiple SecaaS 120. In some embodiments, the connector/PCP Proxy and PCP Client 114 may load-balance the hosts 112 among available PCP servers 150 and/or SecaaS 120. The PCP Proxy co-located with the connector may forward and/or redirect requests from a particular client to an assigned PCP server and/or SecaaS.

In a particular example, a client 112 makes a request to a content provider 140 coupled to the Internet 130 for the delivery of content by one or more sessions. In accordance with various embodiments, the content may include video content, audio content, streaming video content, streaming audio content, or any other content. The PCP proxy/cloud connector 114 receives and redirects the request to the SecaaS 120 for inspection via a tunnel created between PCP proxy/cloud connector 114 and SecaaS 120. In the example illustrated in FIG. 1, PCP clients 112 request 1 . . . N content delivery sessions from content provider 140 and PCP proxy/cloud connector 114 establishes a separate tunnel with SecaaS 120 for each session. In a particular example, a tunnel 0 is established for an audio stream, a tunnel 1 is established for one-way video streaming up to a tunnel N for a WebRTC data channel.

The SecaaS 120 inspects and then forwards the request to content provider 140. Upon receiving content from content provider 140, the SecaaS 120 inspects the content and determines whether a particular network flow associated with the content is of genuine interest and has specific flow characteristics. In response to a determination that the particular network flow warrants signaling, the SecaaS 120 sends flow characteristics of the particular network flow to the PCP proxy/cloud connector 114 over the tunnel. The PCP proxy/cloud connector 114 is configured to install appropriate quality of service rules against the particular network flow within one or more devices within enterprise network 110 such as routers and/or switches based at least in part upon the received flow characteristics.

In accordance with one or more embodiments multiple prioritized tunnels are created between PCP proxy/cloud connector 114 and SecaaS 120. The PCP proxy/cloud connector 114 signals the flow characteristics of each tunnel to the access network (enterprise network 110) such that it can apply appropriate QOS policies. In particular embodiments, the PCP proxy/cloud connector 114 routes traffic over the tunnels based on the flow characteristics conveyed by the PCP client to PCP proxy/cloud connector 114 in a PCP FLOWDATA option.

Figure 2A:
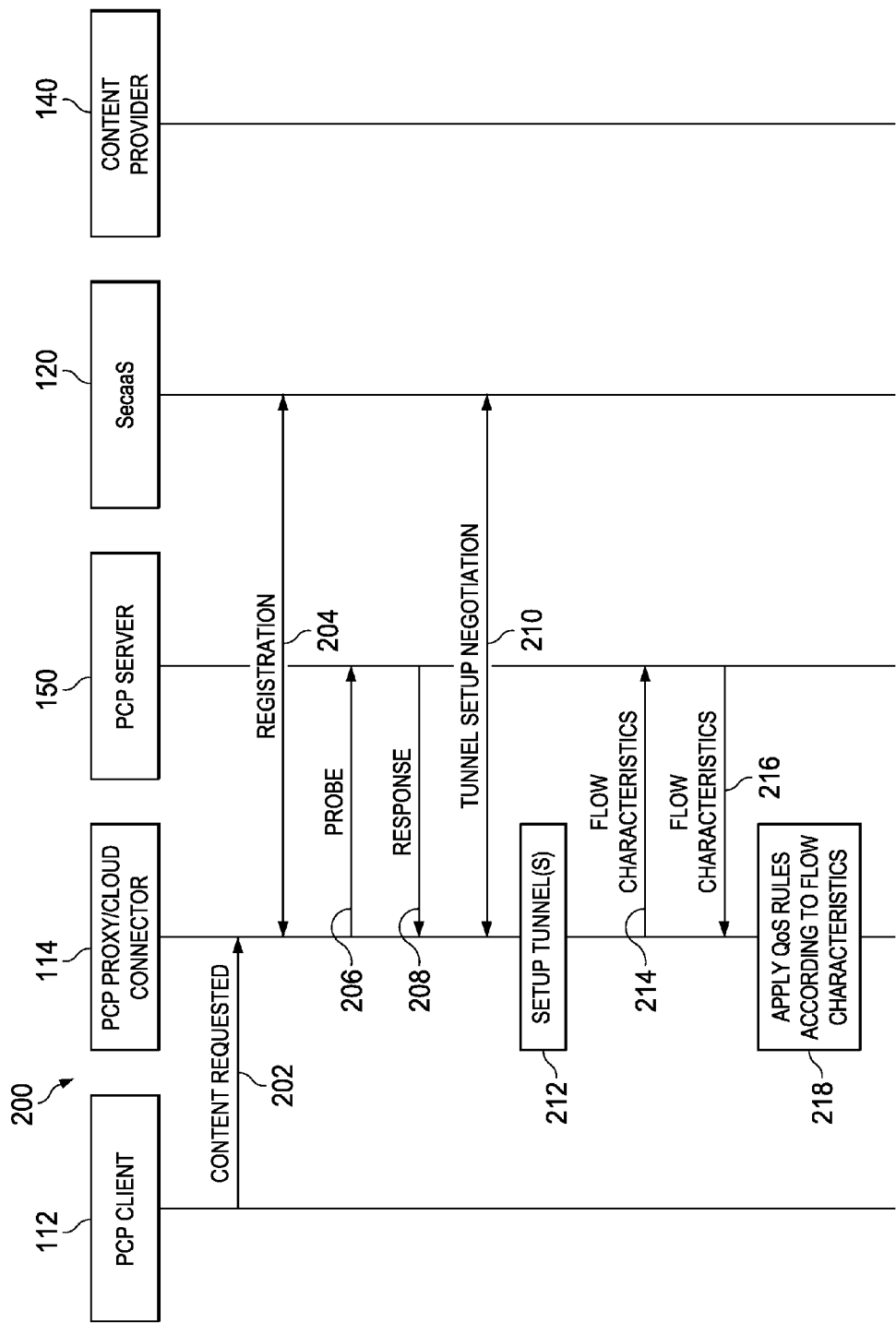
FIGS. 2A-2B illustrate an example of a work flow for the example system in FIG. 1 in accordance with various embodiments.
Figure 2B:
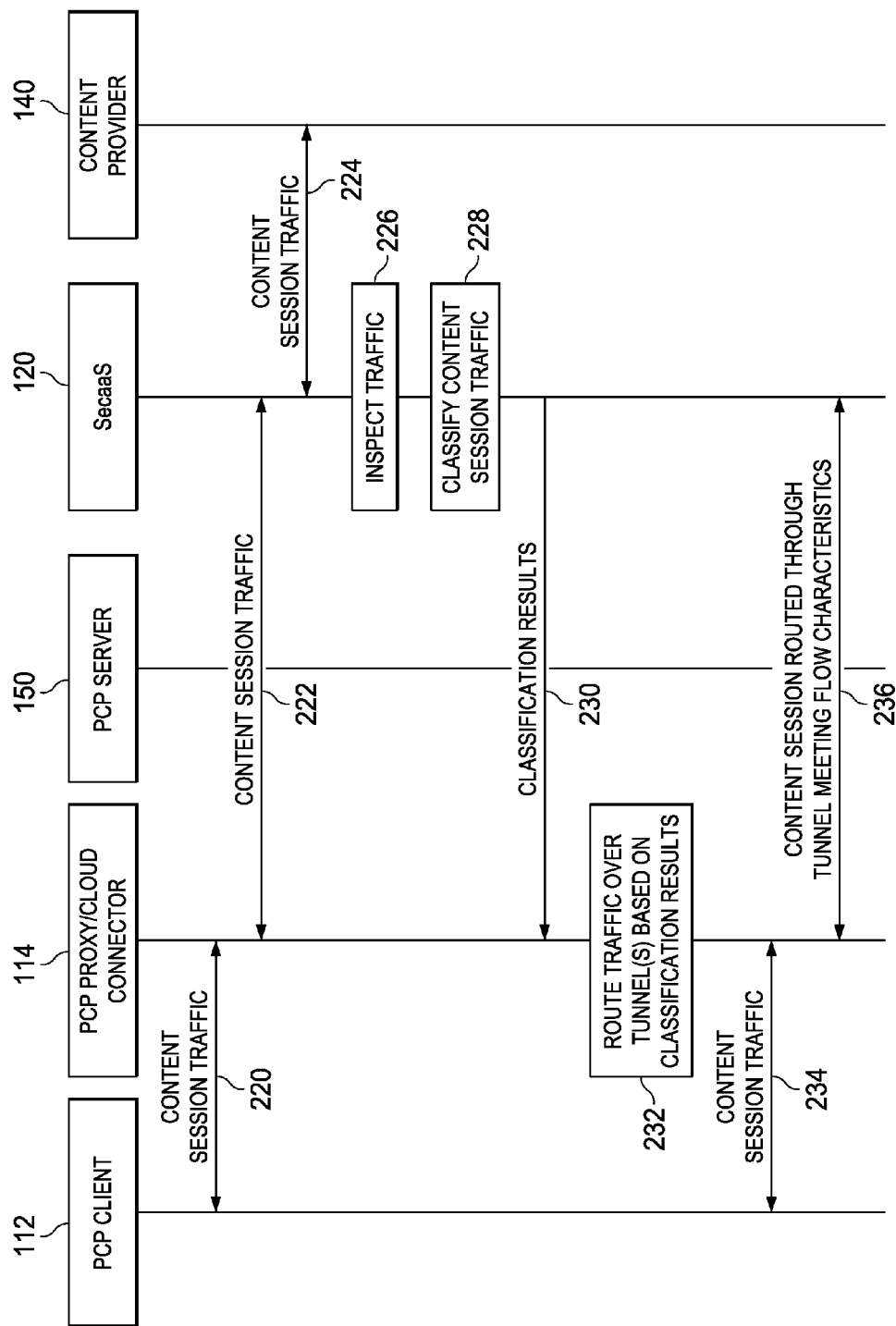

FIGS. 2A-2B illustrate an example of a work flow 200 for the example system in FIG. 1 in accordance with various embodiments. In this example, PCP Client 112 sends one or more content requests 202 to PCP proxy/cloud connector 114. The content request(s) 202 is a request for PCP client 112 to receive content provided content provider 140. PCP proxy/cloud connector 114 initiates a registration procedure 204 with SecaaS 120. PCP proxy/cloud connector 114 sends a probe message 206 to PCP server 150 in the access network to determine whether PCP server 150 supports prioritization of tunneled traffic. PCP server 150 sends a response 208 indicative of whether PCP server 150 supports prioritization of tunneled traffic. If PCP server 150 responds with an indication that it is capable of prioritization of tunneled traffic, PCP proxy/cloud connector 114 initiates a tunnel setup negotiation 210 with SecaaS 120 to negotiate the number of tunnels to be setup between PCP proxy/cloud connector 114 and SecaaS 120 and the priority of each tunnel. In a tunnel setup procedure 212, PCP proxy/cloud connector 114 sets up the desired number of tunnels with priority information expressed as part of identity attributes used for tunnel authentication.

Once all tunnels are set-up, PCP proxy/cloud connector 114 signals flow characteristics 214 for each tunnel to PCP server 150 in the access network. Since all tunnels setup between PCP proxy/cloud connector 114 and SeecaS 120 use the same source IP address and destination IP address, PCP is extended so that the PCP proxy along with flow characteristics convey an Internet Protocol Security (IPsec) Security Parameter Index (SPI). The SPI is unique to each tunnel and used to distinguish between different tunnels. PCP server 150 uses the SPI as a tunnel identifier to distinguish and treat the tunnels appropriately.

PCP server 150 in the access network signals the flow characteristics 216 of each tunnel to PCP proxy/cloud connector 114 to enable one or more network devices (such as switches or routers) within enterprise network 110 to be configured to apply quality of service (QoS) rules against each tunnel. In 218, the QoS rules are applied to the network device(s) according to the flow characteristics indicated by PCP server 150. In a particular embodiment, PCP server 150 signals the flow characteristics for each tunnel to a software-defined networking (SDN) controller using Representational State Transfer (REST), Extensible Messaging and Presence Protocol (XMPP) or a similar protocol. The SDN controller may in-turn use southbound APIs to program the network devices to apply QoS policies against each tunnel. In this way, the access network installs appropriate quality of service rules against each tunnel based on flow characteristics received from PCP proxy/cloud connector 114.

Next, in 220 content session traffic flows between PCP client 112 and PCP proxy/cloud connector 114. In 222, the content session traffic flows between PCP proxy/cloud connector 114 and SecaaS 120. In 224, the content session traffic flows between SecaaS 120 and content provider 140. In 226, SecaaS 120 inspects the content session traffic from content provider 140 and may perform one or more security operations upon the content session traffic. In 228, SecaaS 120 classifies the content session traffic for routing over a selected one of the tunnels based on flow characteristics conveyed from PCP client 112 or by some other classification logic of its own. In 230, SecaaS 120 sends the classification results to PCP proxy/cloud connector 114. In 232, PCP proxy/cloud connector 114 routes the classified traffic over the selected tunnel having the required flow characteristics based upon the classification results. In 234, content session traffic passes between PCP client 112 and PCP proxy/cloud connector 114, In 236, the content session traffic is routed between PCP proxy/cloud connector 114 and SecaaS 120 through the tunnel that meets the required flow characteristics. As a result, the context session traffic flows over the selected tunnel between PCP client 112 and SecaaS 120. SecaaS 120 then passes the inspected content session traffic flow 230 between SecaaS 120 and content provider 140. Accordingly, bidirectional traffic between PCP client 112 and content provider 140 will pass through SecaaS 120 for inspection using one or more tunnels established between PCP client 112 and SecaaS 120 meeting the requested flow characteristics. Although the example embodiment is discussed in the context of an IPsec protocol, other embodiments may use other tunneling technologies such as Generic Routing Encapsulation (GRE) protocol, IP-in-IP, etc.

Figure 3:
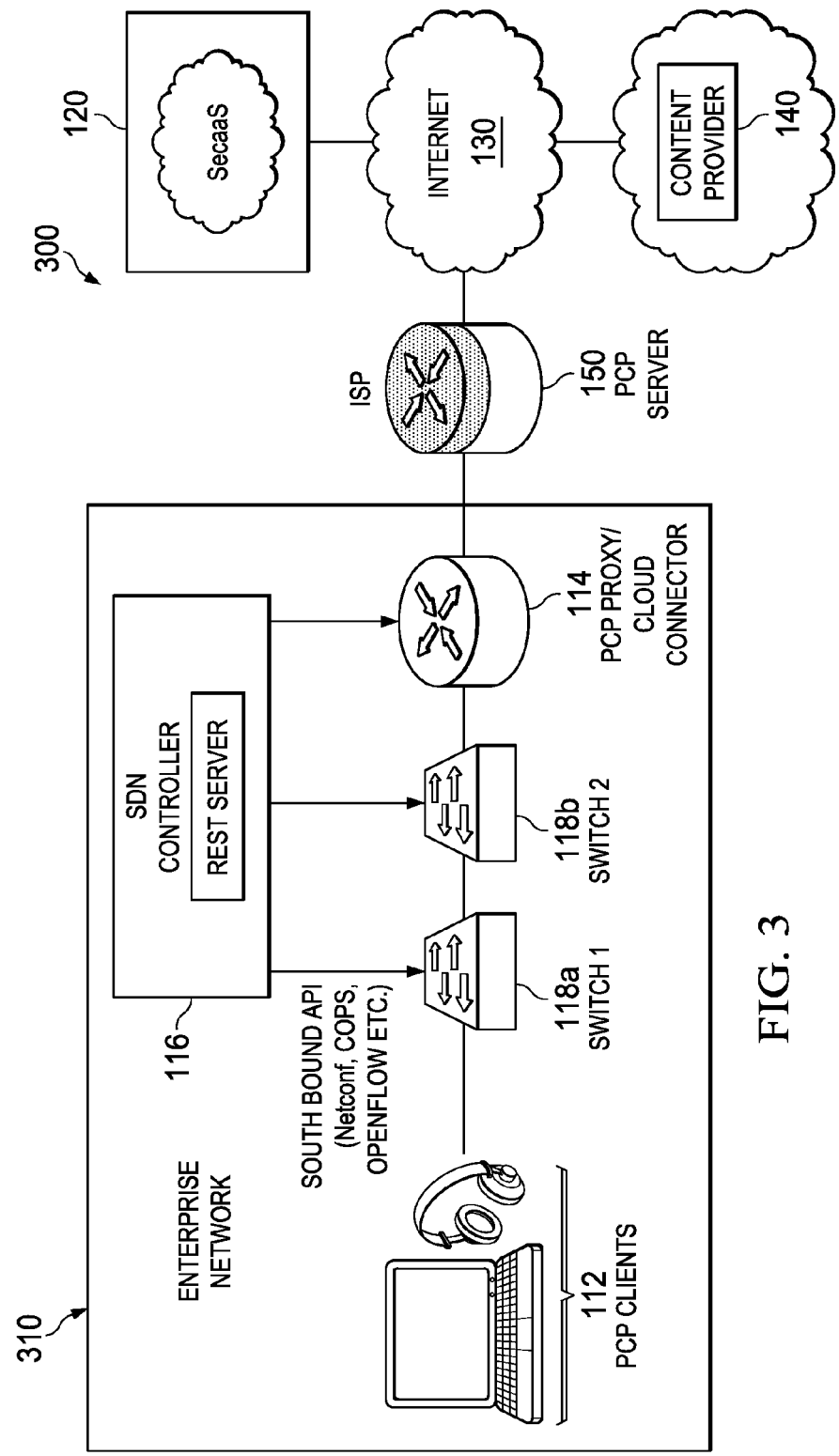
FIG. 3 illustrates another example system for providing differentiated quality of service using tunnels with security as a service in a telecommunications network in accordance with various embodiments.

FIG. 3 illustrates a communication system 300 for providing differentiated quality of services using tunnels with security as a service in a telecommunications network in accordance with various embodiments. In this example, the system 300 includes an enterprise network 310, which includes client 112, PCP proxy/cloud connector 114, a software-defined networking (SDN) controller 116, a switch1 118a, and a switch2 118b. PCP proxy/cloud connector 114 is coupled to a SecaaS 120 via the Internet 130. The PCP proxy/cloud connector 114 is coupled to PCP client 112 via switch1 118a and switch2 118b. SDN controller 116 is in communication with PCP proxy/cloud connector 114, switch1 118a, and switch2 118b. PCP proxy/cloud connector 114 is coupled to a SecaaS 120 via the Internet 130. SDN controller 116 is configured to configure switch1 118a and switch2 118b to implement QoS rules for each tunnel in accordance with the flow characteristics required for each tunnel as will be further described herein. In the particular embodiment illustrated in FIG. 3, SDN controller 116 includes a REST client for programming switch1 118a and switch2 118b via a REST protocol.

In a particular example, client 112 makes a request to content provider 140 coupled to the Internet 130 for the delivery of content by one or more sessions. The PCP proxy/cloud connector 114 receives and redirects the request to the SecaaS 120 for inspection via one or more tunnels created between PCP proxy/cloud connector 114 and SecaaS 120.

The SecaaS 120 inspects and then forwards the request to content provider 140. Upon receiving content from content provider 140, the SecaaS 120 inspects the content and determines whether a particular network flow associated with the content is of genuine interest and has specific flow characteristics. In response to a determination that the particular network flow warrants signaling, the SecaaS 120 sends flow characteristics of the particular network flow to the PCP proxy/cloud connector 114 over the tunnel. The PCP proxy/cloud connector 114 is configured to provide flow characteristics for each tunnel to SDN controller 116, and SDN controller 116 is configured to install appropriate quality of service rules against the particular network flow through on-path network devices (e.g., at least one of switch1 118a, switch2 118b, PCP proxy/cloud connector 114 and/or PCP Client 112) by using southbound APIs (e.g., Common Open Policy Service usage for Policy Provisioning (COPS-PR), Network Configuration Protocol (Netconf), or Openflow), based upon the received flow characteristics.

In accordance with one or more embodiments multiple prioritized tunnels are created between PCP proxy/cloud connector 114 and SecaaS 120. The PCP proxy/cloud connector 114 signals the flow characteristics of each tunnel to the access network (enterprise network 310) such that SDN controller 116 can configure switch1 118a and switch2 118b to apply appropriate QOS policies. In particular embodiments, the PCP proxy/cloud connector 114 routes traffic over the tunnels based on the flow characteristics conveyed by PCP client 112 to PCP proxy/cloud connector 114 in a PCP FLOWDATA option.

Figure 4A:
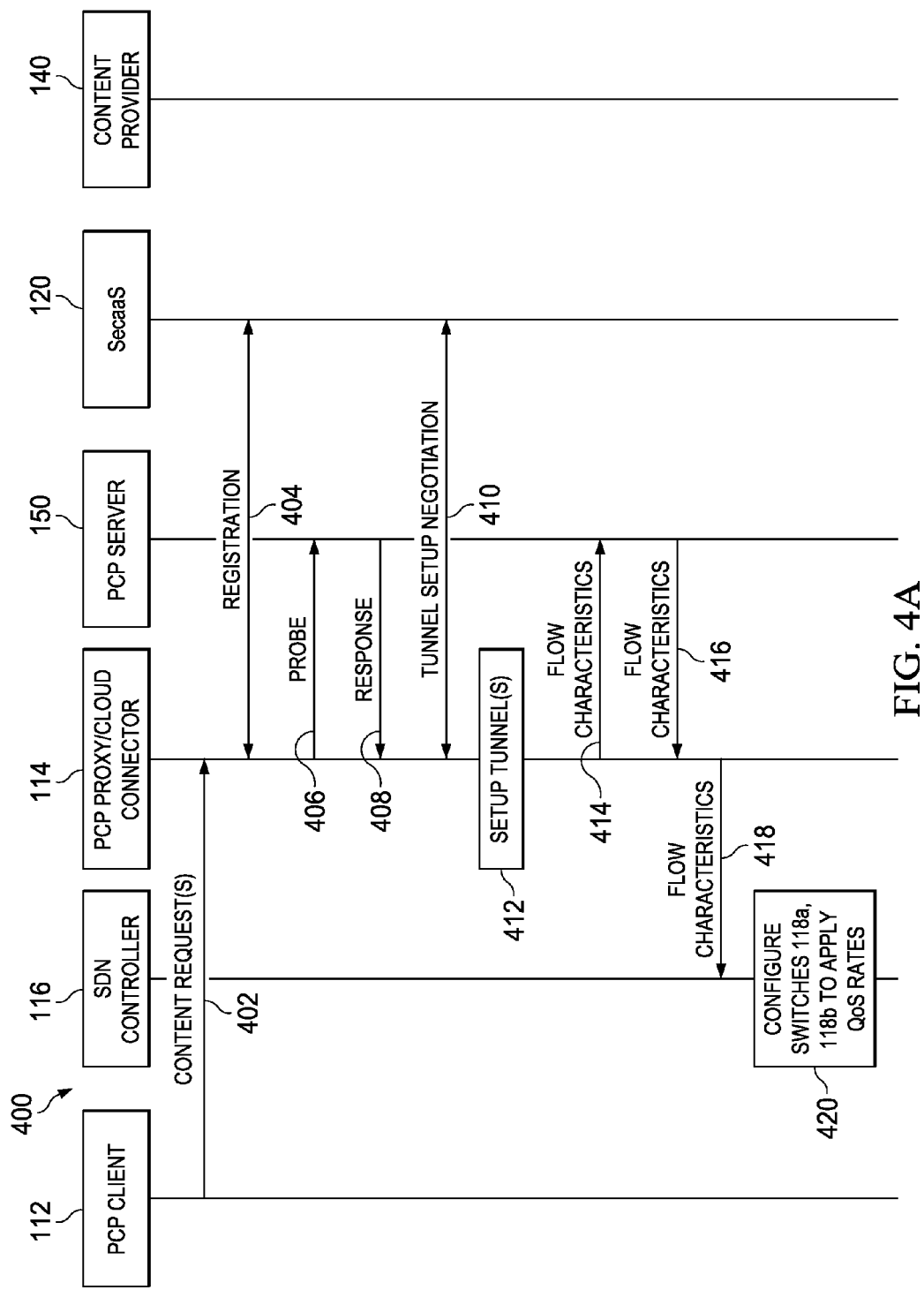
FIGS. 4A-4B illustrate an example of a work flow for the system of FIG. 3 in accordance with various embodiments.
Figure 4B:
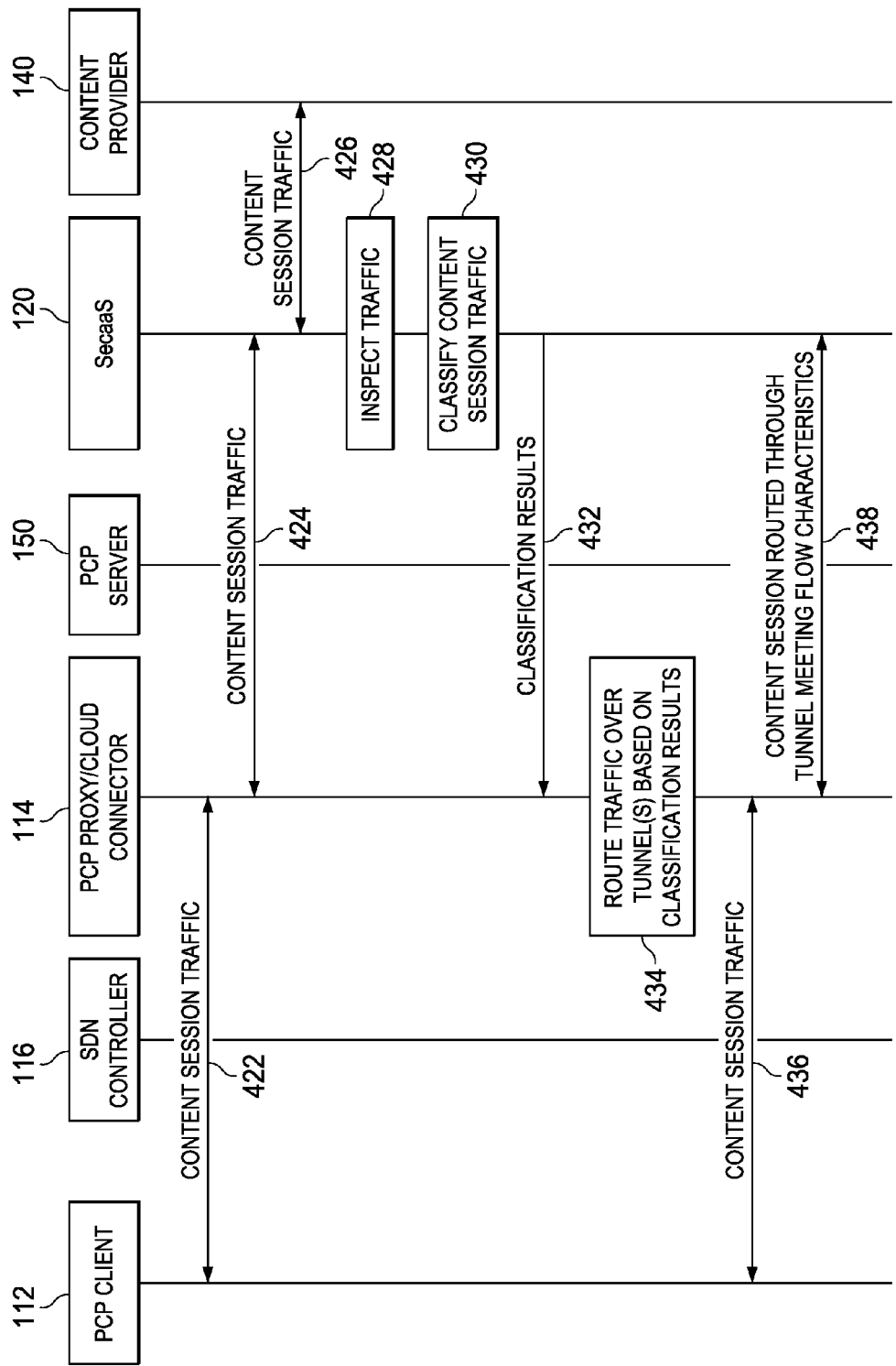

FIGS. 4A-4B illustrate an example of a work flow 400 for the system of FIG. 3 in accordance with various embodiments. In this example, PCP Client 112 sends one or more content requests 402 to PCP proxy/cloud connector 114. The content request(s) 402 is a request for PCP client 112 to receive content provided by content provider 140. PCP proxy/cloud connector 114 initiates a registration procedure 404 with SecaaS 120. PCP proxy/cloud connector 114 sends a probe message 406 to PCP server 150 in the access network to determine whether PCP server 150 supports prioritization of tunneled traffic. PCP server 150 sends a response 408 indicative of whether PCP server 150 supports prioritization of tunneled traffic. If PCP server 150 responds with an indication that it is capable of prioritization of tunneled traffic, PCP proxy/cloud connector 114 initiates a tunnel setup negotiation 410 with Secaas 120 to negotiate the number of tunnels to be setup between PCP proxy/cloud connector 114 and Secaas 120 and the priority of each tunnel. In a tunnel setup procedure 412, PCP proxy/cloud connector 114 sets up the desired number of tunnels with priority information expressed as part of identity attributes used for tunnel authentication.

Once all tunnels are set-up, PCP proxy/cloud connector 114 signals flow characteristics 414 for each tunnel to PCP server 150 in the access network. Since all tunnels setup between PCP proxy/cloud connector 114 and SeecaS 120 use the same source IP address and destination IP address, PCP is extended so that the PCP proxy along with flow characteristics convey an Internet Protocol Security (IPsec) Security Parameter Index (SPI). The SPI is unique to each tunnel and used to distinguish between different tunnels. PCP server 150 uses the SPI as a tunnel identifier to distinguish and treat the tunnels appropriately.

PCP server 150 in the access network signals the flow characteristics it can accommodate 416 of each tunnel to PCP proxy/cloud connector 114. PCP proxy/cloud connector 114 sends the flow characteristics 418 to SDN controller 116. In 420, SDN controller 116 configured one or more of switches 118a, 118b to apply the QoS rules required by the flow characteristics for each tunnel. In a particular embodiment, PCP server 150 signals the flow characteristics for each tunnel to SDN controller 116 using a REST protocol, XMPP, or a similar protocol. SDN controller 116 may in-turn use southbound APIs to program the network devices to apply QoS policies against each tunnel. In this way, the access network installs appropriate quality of service rules against each tunnel based on flow characteristics received from PCP proxy/cloud connector 114.

Next, in 422 content session traffic flows between PCP client 112 and PCP proxy/cloud connector 114. In 424, the content session traffic flows between PCP proxy/cloud connector 114 and SecaaS 120. In 426, the content session traffic flows between SecaaS 120 and content provider 140. In 428, SecaaS 120 inspects the content session traffic from content provider 140 and may perform one or more security operations upon the content session traffic. In 430, SecaaS 120 classifies the content session traffic for routing over a selected one of the tunnels based on flow characteristics conveyed from PCP client 112 or by some other classification logic of its own. In 432, SecaaS 120 sends the classification results to PCP proxy/cloud connector 114. In 434, PCP proxy/cloud connector 114 routes the classified traffic over the selected tunnel having the required flow characteristics based upon the classification results. In 436, content session traffic passes between PCP client 112 and PCP proxy/cloud connector 114, In 438, the content session traffic is routed between PCP proxy/cloud connector 114 and SecaaS 120 through the tunnel that meets the required flow characteristics. As a result, the context session traffic flows over the selected tunnel between PCP client 112 and SecaaS 120. SecaaS 120 then passes the inspected content session traffic flow 230 between SecaaS 120 and content provider 140. Accordingly, bidirectional traffic between PCP client 112 and content provider 140 will pass through SecaaS 120 for inspection using one or more tunnels established between PCP client 112 and SecaaS 120 meeting the requested flow characteristics. Although the example embodiment is discussed in the context of an IPsec protocol, other embodiments may use other tunneling technologies such as Generic Routing Encapsulation (GRE) protocol, IP-in-IP, etc. Within enterprise network 310, network elements such as switches 118a, 118b implement the QoS rules for traffic flowing between PCP client 112 and content provider 140.

Figure 5:
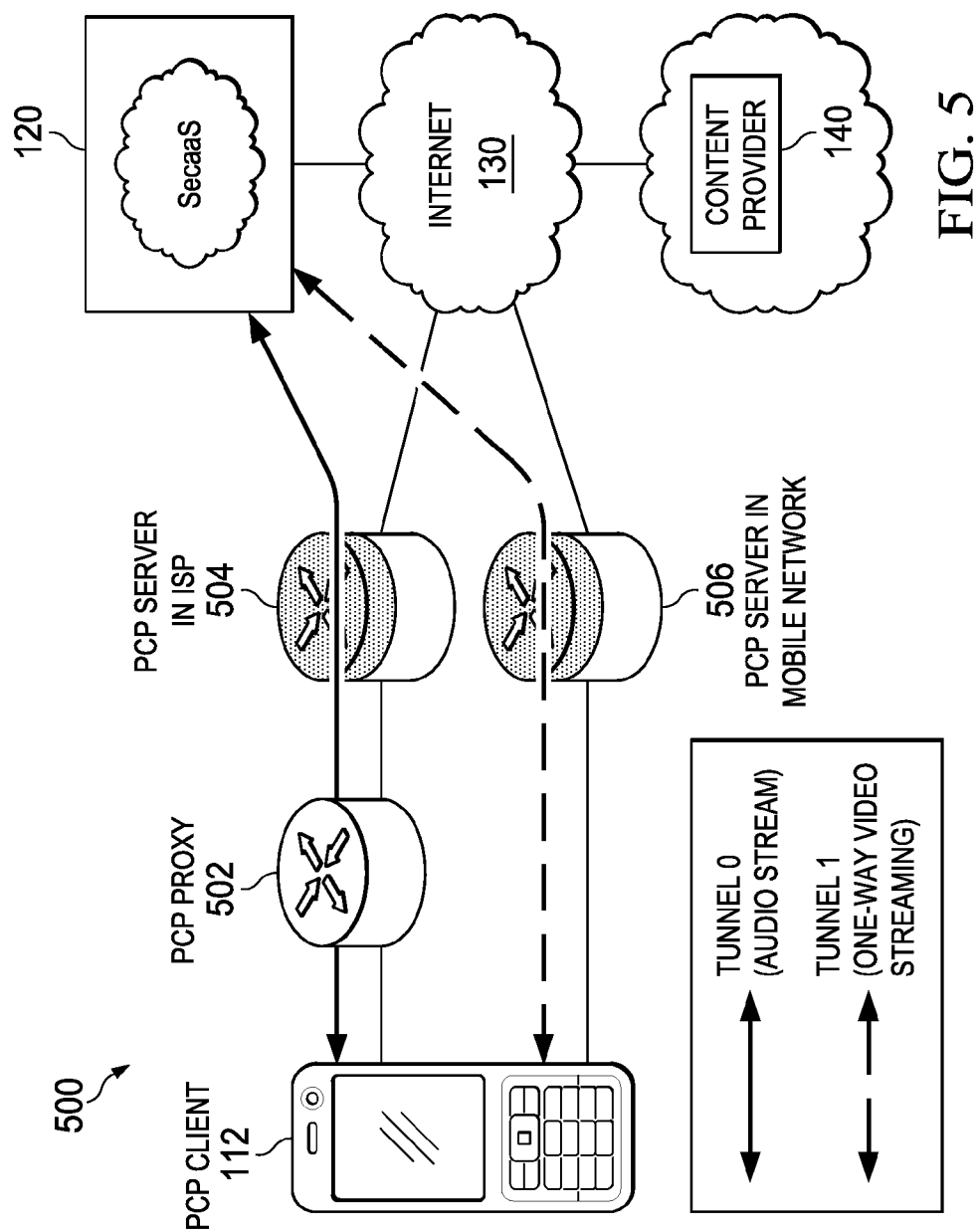
FIG. 5 illustrates a communication system for providing differentiated quality of service using tunnels with security as a service in a telecommunications network in accordance with another embodiment.

FIG. 5 illustrates a communication system 500 for providing differentiated quality of service using tunnels with security as a service in a telecommunications network in accordance with another embodiment. In this example, system 500 includes a PCP client 112, a PCP proxy 502, a first PCP server 504 located in an ISP, a second PCP server located in a mobile network, and a SecaaS 120. In particular embodiments, PCP client 112 is a mobile device that is currently not within a home network, such as a corporate office, and is instead roaming within another network or networks. However, it is still desired to tunnel traffic from PCP client 112 to SecaaS 120 to subject to inspection by SecaaS 120 as traffic flows between PCP client 112 and content provider 140. PCP client 112 is connected to PCP proxy 502 via wireless (e.g., Wi-Fi) connection, and PCP proxy 502 is in further communication with the first PCP server 504 located at the ISP.

First PCP server 504 is further in communication with SecaaS 120. PCP client 112 is communication with second PCP server 506 located in the mobile network, and second PCP server 506 is in further communication with SecaaS 120. SecaaS 120 is in further communication with content provider 140 via the Internet 130 and is configured to perform security functions upon data traffic between PCP client 112 and content provider 140. In one or more embodiments, a first communication path (IP1) is established between PCP client 112 and SecaaS 120 via PCP proxy 502 and first PCP server 504, and a second communication path (IP2) is establish between PCP client 112 and SecaaS 120 via second PCP server 506. PCP proxy 502 includes a PCP proxy function that operates as a PCP proxy to facilitate communication between the PCP client 112 and PCP server 504 hosted by an ISP. The PCP proxy function may act as a PCP server receiving PCP requests on internal interfaces, and as a PCP client to forward accepted PCP requests on an external interface to PCP server 504. The PCP Proxy function relays PCP requests received from the PCP clients 112 to PCP servers 504.

In one or more embodiments, the first communication path including the Wi-Fi connection initially functions as a primary path and the second communication path including the 3G connection initially functions as a backup path for a particular application such as downloading files to PCP client 112 from content provider 140. Upon failure of the first communication path, PCP client 112 may switch over to the backup path for the particular application. In a particular embodiment, PCP client 112 establishes a tunnel 0 with SecaaS 120 over the Wi-Fi connection as a primary path for one-way video streaming, a tunnel 1 with SecaaS 120 over the 3G connection as a primary path for file download, a tunnel 2 with SecaaS 120 over the 3G connection as a backup path for one-way video streaming, and a tunnel 3 with SecaaS 120 over the WiFi connection as a backup path for file download.

In one or more embodiments, PCP client 112 utilizes PCP to signal flow characteristics to the network and PCP client 112 determines the tunnels that will be used by a particular application based upon negotiation between PCP client 112 and the access network. In particular embodiments, a Mobility and Multihoming (MOBIKE) Protocol using Internet Key Exchange (IKEv2) such as described in RFC 4621 may be used to establish tunnels over the primary communication path and secondary communication path between PCP client 112 and SecaaS 120. In a particular embodiment, PCP client 112 uses IKEv2 signals to communicate to SecaaS 120 that it has multiple IP addresses associated with tunnel 0, a first IP address associated with the first communication path (IP1) and a second IP address associated with the second communication path (IP2) and available for backup. In addition, In a particular embodiment, PCP client 112 uses IKEv2 signals to communicate to SecaaS 120 that it has multiple IP addresses associated with tunnel 1, a first IP address associated with the second communication path (IP2) and a second IP address associated with the first communication path (IP1) and available for backup.

In one or more embodiments, an application of the PCP client 112 detects the presence of "Untrusted Networks" after gaining access to the network. In one particular embodiment, PCP client 112 uses techniques such as the domain name system (DNS) suffix to detect the presence of untrusted networks. If untrusted networks are available, PCP client 112 uses PCP to probe the PCP server in each of the access networks (i.e., PCP server 504 and PCP server 506) to determine if the access network supports prioritization of tunneled traffic. If the particular PCP server responds that it is capable of prioritization of tunneled traffic, then PCP client 112 marks the associated interfaces as potential interfaces to setup IPsec tunnels using a MOBIKE extension of IKEv2. As part of a registration procedure, PCP client 112 negotiates the number of tunnels to be setup with SecaaS 120 and the priority of each tunnel. PCP client 112 then picks the peer address set, i.e. locally operational addresses that will be chosen from untrusted network as discussed in RFC 4621.

PCP client 112 uses a MOBIKE extension of IKEv2 to set up the desired number of tunnels on one of the interfaces, with the priority information expressed as part of identity attributes used for tunnel authentication. For each IPSEC tunnel setup, addresses learned from other untrusted interfaces are signaled in MOBIKE extension of IKE2 as additional addresses.

Once all tunnels are up, PCP client 112 on the available interfaces signals the flow characteristics for each tunnel to the upstream PCP server (e.g., first PCP server 504 and PCP server 506) in each access network. PCP is extended so that PCP client 112 conveys the IPSec SPI along with flow characteristics. PCP server 504 and/or 506 uses this SPI to distinguish and treat tunnels appropriately. In other words, all the addresses in the peer address set are used to probe if the underlying networks can meet the requested flow characteristics of the tunnel. When an SPI change occurs, PCP client 112 signals the updated SPI to the particular PCP server 504 and/or 506.

PCP server 504 and/or 506 sends a PCP server response that is used to determine which interfaces can meet the requested flow characteristics and thus will be used for IPSec traffic. In other words, an address from an interface that can meet the requested flow characteristics will be nominated for IPSec traffic (the nominated address is referred to as preferred address in RFC 4621). If there are multiple interfaces that can meet the flow characteristics, then other parameters like cost per bit may be used to select the preferred address. Additional addresses from other interfaces are prioritized based on the PCP server response for fail-over. Thus, IPSec tunnels may be active on multiple interfaces and flows may be re-directed through appropriate tunnels based on the flow characteristics signaled by PCP client 112. In accordance with one or more embodiments, connectivity tests are performed periodically on the backup and active paths to find the delay characteristics and this metric may be used as a tie-breaker for picking the suitable interface for a tunnel that re-directs delay-sensitive flows to SecaaS 120.

PCP server 504 and/or 506 signals the flow characteristics of the tunnel to one or more network elements/devices within the particular access network to implement the flow characteristics for the tunnel. In one or more particular embodiments, PCP server 504 and/or 506 signals the flow characteristics of the tunnel to an SDN controller within the particular access network using REST, Extensible Messaging and Presence Protocol (XMPP) or a similar protocol. The SDN controller in-turn uses southbound APIs to program the network devices to apply QOS policies against the IPSEC tunnel.

If one of the interfaces becomes unavailable then a MOBIKE extension of IKEv2 is used to migrate the IPSec traffic to another interface that can also meet the requested flow characteristics. In this way, the IPSec tunnel can be moved to a different interface without the need to re-establish IKE security association (SA). If a new interface is available then a portion of the above procedure, such as the procedures described in the previous three paragraphs may be repeated to determine if it can meet the requested flow characteristics. Addresses from this interface are signaled as additional addresses in a MOBIKE extension of IKE2 for fail-over.

Figure 6A:
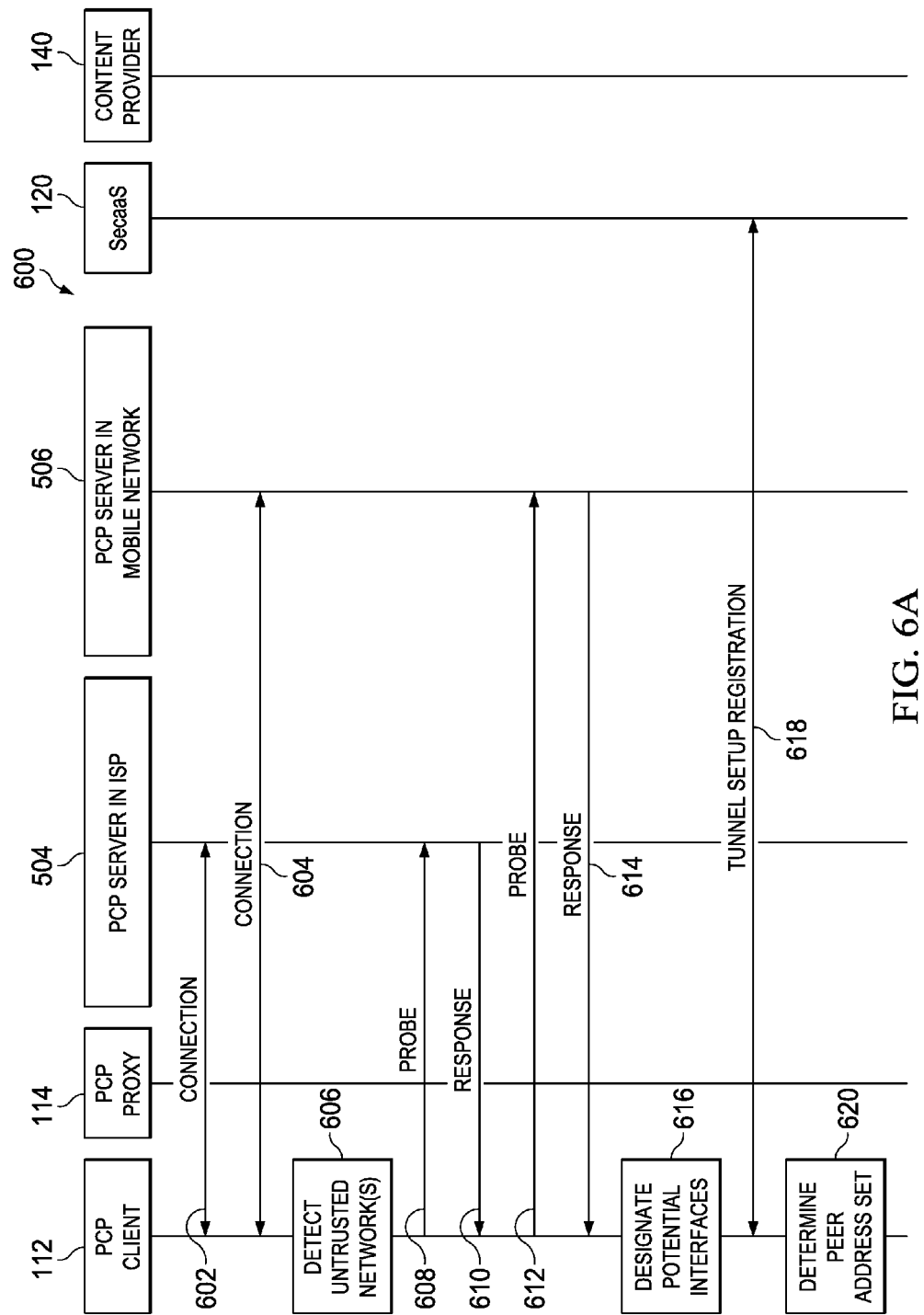
FIGS. 6A-6B illustrate an example of a work flow 600 for the communication system of FIG. 5 in accordance with various embodiments.
Figure 6B:
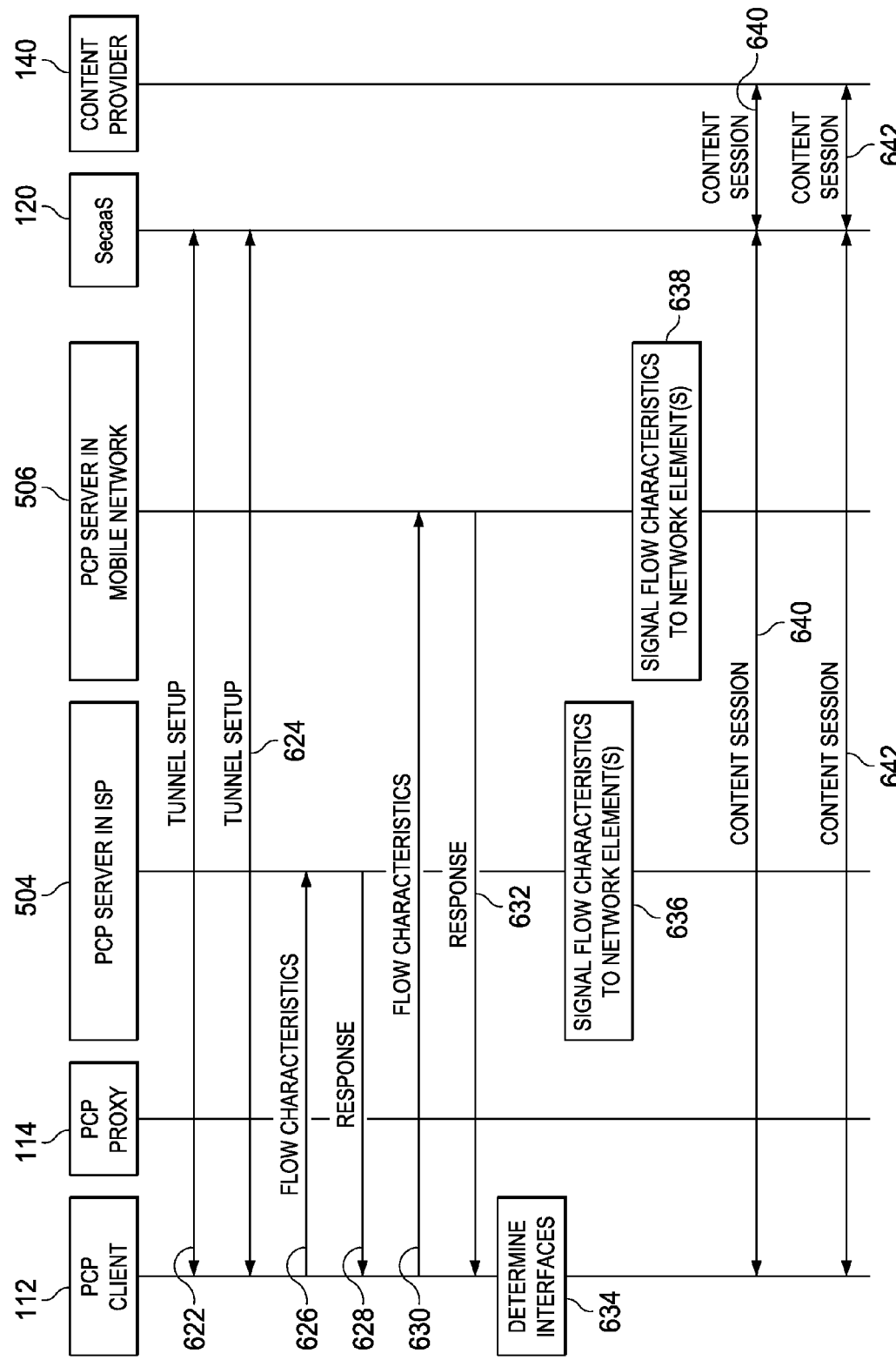

FIGS. 6A-6B illustrate an example of a work flow 600 for the communication system of FIG. 5 in accordance with various embodiments. In 602, PCP client 112 connects to the first access network via PCP server 504 in the ISP. In 604, PCP client 112 connects to the second access network via PCP server 506 in the mobile network. In 606, PCP client 112 detects whether one or more of first access network or second access network is an untrusted network. In one particular embodiment, PCP client 112 detects the presence of an untrusted network via a domain name system (DNS) suffix associated with the access network. If untrusted networks are available, PCP client 112 sends a first PCP probe message 608 to first PCP server 504. First PCP server 504 then sends a first response message to PCP client 112 indicative of whether the first access network supports of tunneled traffic. PCP client 112 sends a second PCP probe message 608 to second PCP server 506. Second PCP server 506 then sends a second response message to PCP client 112 indicative of whether the second access network supports of tunneled traffic.

If the particular PCP server 504 and/or 506 responds that it is capable of prioritization of tunneled traffic, in 616 PCP client 112 designates the associated interfaces as potential interfaces to setup IPsec tunnels using a MOBIKE extension of IKEv2. In 618, PCP client 112 initiates a tunnel setup registration procedure with SecaaS 120 in which PCP client 112 negotiates the number of tunnels to be setup with SecaaS 120 and the priority of each tunnel. In 620, PCP client 112 determines the peer address set, i.e. locally operational addresses that will be chosen from the first access network and the second access network.

In 622, PCP client 112 sets up the desired number of tunnels between PCP client 112 and SecaaS 120 via first PCP server 504 with the priority information for each tunnel expressed as part of identity attributes used for tunnel authentication. In 624, PCP client 112 sets up the desired number of tunnels between PCP client 112 and SecaaS 120 via second PCP server 506 with the priority information for each tunnel expressed as part of identity attributes used for tunnel authentication.

Once all tunnels are up, PCP client 112 signals the flow characteristics and SPI for each tunnel of the first access network to first PCP server 504 in 626. First PCP server 504 uses the SPI for each tunnel to distinguish and treat each tunnel appropriately. In other words, all the addresses in the peer address set are used to probe if the underlying networks can meet the requested flow characteristics of the tunnel within the first access network. In 628, first PCP server 504 sends a response message indicative of the interface that can meet the requested flow characteristics for traffic. In 630, PCP client 112 signals the flow characteristics and SPI for each tunnel of the second access network to second PCP server 506. Second PCP server 506 uses the SPI for each tunnel to distinguish and treat each tunnel appropriately. In 632, second PCP server 506 sends a response message indicative of the interface that can meet the requested flow characteristics for traffic within the second access network.

In 634, PCP client 112 determines the interfaces that can meet the requested flow characteristics for each of the first access network and the second access network. In various embodiments, an address from an interface that can meet the requested flow characteristics will be nominated for traffic over the tunnel. If there are multiple interfaces that can meet the flow characteristics, then other parameters like cost may be used to select the preferred address. Additional addresses from other interfaces are prioritized based on the PCP server response to accommodate the requested flow characteristics. Thus, IPSec tunnels may be active on multiple interfaces and flows may be re-directed through appropriate tunnels based on the flow characteristics signaled by PCP client 112. In accordance with one or more embodiments, connectivity tests are performed periodically on the backup and active paths to find the delay characteristics and this metric may be used as a tie-breaker for picking the suitable interface for a tunnel that re-directs delay-sensitive flows to SecaaS 120.

In 636, first PCP server 504 signals the flow characteristics of each tunnel of the first access network to one or more network elements (e.g., an SDN controller, switches, routers, etc.) within the first access network to implement the flow characteristics, such as implementing QoS rules, for the tunnel. In 638, second PCP server 506 signals the flow characteristics of each tunnel of the second access network to one or more network elements (e.g., an SDN controller, switches, routers, etc.) within the second access network to implement the flow characteristics for the tunnel. In one or more particular embodiments, PCP server 504 and/or 506 signals the flow characteristics of the tunnel to an SDN controller within the particular access network using REST, Extensible Messaging and Presence Protocol (XMPP) or a similar protocol. The SDN controller in-turn uses southbound APIs to program the network devices to apply QOS policies against the IPSEC tunnel.

In 640, first context session traffic flows over the selected tunnel(s) between PCP client 112 and content provider 140 via first PCP server 504 and SecaaS 120. SecaaS 120 inspects the first content session traffic between PCP client 112 and content provider 140 and may perform one or more security operations upon the first content session traffic. In 642, second context session traffic flows over the selected tunnel(s) between PCP client 112 and content provider 140 via second PCP server 506 and SecaaS 120. SecaaS 120 inspects the second content session traffic between PCP client 112 and content provider 140 and may perform one or more security operations upon the second content session traffic. If one or more active paths fails, the content session traffic may be migrated to a backup path.

Figure 7:
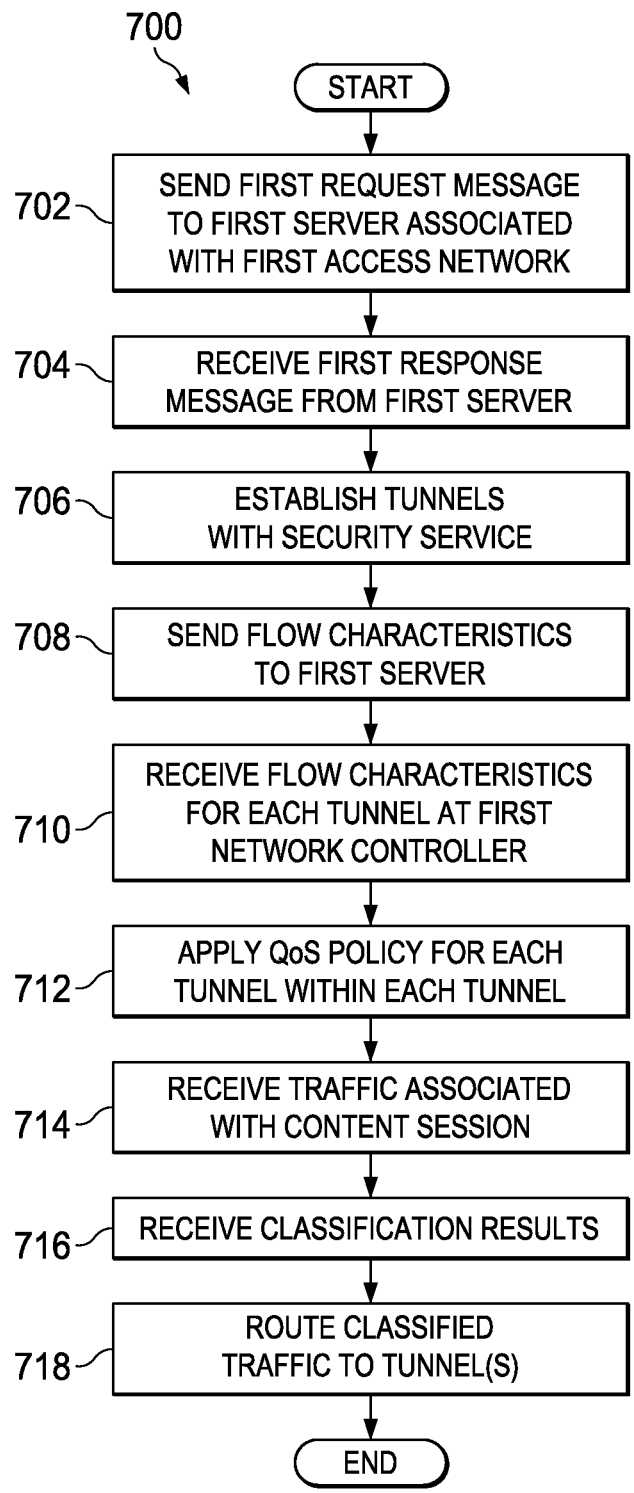
FIG. 7 illustrates a process for providing differentiated quality of service in accordance with one embodiment.

FIG. 7 illustrates a process 700 for providing differentiated quality of service in accordance with one embodiment. In 702, a first request message is sent to a first server (e.g., a PCP server) associated with a first access network. The first request message is indicative of a request for an indication of whether the first server is configured to support prioritization of tunneled traffic. In particular embodiments the first request message is sent by a proxy within the first access network. In another particular embodiment, the first request message is sent by a client device (e.g., PCP client 112) connected to the first network. In other particular embodiment, the first request message includes a port control protocol (PCP) proxy probe message. In particular embodiments, the first server is a port control protocol (PCP) server.

In 704, a first response message is received from the first server. The first response message is indicative of whether the first server is configured to support prioritization of tunneled traffic. In 706, one or more first access network tunnels are established with a security service when the first response message is indicative that the first server is configured to support prioritization of tunneled traffic. Each first access network tunnel has priority information associated therewith. In 708, first flow characteristics and a first tunnel identifier for each first access network tunnel are sent to the first server. In particular embodiments, the tunnel identifier are an Internet Protocol Security (IPsec) Security Parameter Index (SPI). In 710, the first flow characteristics are received for each first access network tunnel from the first server at a first network controller. In 712, the first network controller applies a quality of service (QoS) policy within the first access network for each tunnel in accordance with the flow characteristics. In a particular embodiment, the first network controller includes a software-defined networking (SDN) controller. In other particular embodiments, the first network controller is configured to apply the quality of service policy within the first access network for each tunnel by configuring one or more network devices (e.g., a router and/or a switch) within the first access network to apply the QoS policy for each tunnel.

In 714, traffic associated with a content session established between a client device and a content provider is received. In 716, classification results of the traffic associated with the content session are received from a network-based security service configured to inspect and classify the content session traffic. In particular embodiments, the traffic is classified according to required flow characteristics received from the client device. In 718, the classified traffic is routed over a selected one of the one or more tunnels having the required flow characteristics. The procedure 700 then ends.

Other embodiments may further include sending a second request message to a second server associated with a second access network, the second request message indicative of a request for an indication of whether the second server is configured to support prioritization of tunneled traffic; receiving a second response message from the second server, the second response message indicative of whether the second server is configured to support prioritization of tunneled traffic; and establishing one or more second access network tunnels with the security service when the second response message is indicative that the second server is configured to support prioritization of tunneled traffic, each second access network tunnel having priority information associated therewith.

Still other embodiments may further include sending second flow characteristics and a second tunnel identifier for each second access network tunnel to the second server; and receiving the second flow characteristics for each second access network tunnel from the second server at a second network controller, the second network controller configured to apply a quality of service (QoS) policy within the second access network for each second access network tunnel in accordance with the flow characteristics.

In particular embodiments, the first access network is a Wi-Fi access network. In still other embodiments, the second access network is a mobile network. In other particular embodiments, the one or more second access network tunnels are established using a Mobility and Multihoming (MOBIKE) Protocol using Internet Key Exchange (IKE).

Various embodiments of the present disclosure provide methods for prioritizing network flows and providing differentiated quality of service for tunneled traffic using security as a service. While specific examples have been cited above showing how the optional operation may be employed in different instructions, other embodiments may incorporate the optional operation into different instructions. For clarity of explanation, in some instances the present disclosure may be presented as including individual functional blocks including functional blocks comprising devices, device components, steps or routines in a method embodied in software, or combinations of hardware and software.

The various embodiments can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent embodiments, or portions thereof, are implemented in hardware, the present invention may be implemented with any or a combination of the following technologies: a discreet logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most embodiments utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    sending a first request message to a first server associated with a first access network, the first request message indicative of a request for an indication of whether the first server is configured to support prioritization of tunneled traffic;
    receiving a first response message from the first server, the first response message indicative of whether the first server is configured to support prioritization of tunneled traffic;
    establishing one or more first tunnels with a security service when the first response message is indicative that the first server is configured to support prioritization of tunneled traffic, each first tunnel having priority information associated therewith;
    sending first flow characteristics and a first tunnel identifier to the first server; and
    receiving the first flow characteristics for each first tunnel from the first server at a first network controller, the first network controller configured to apply a quality of service (QoS) policy within the first access network for each tunnel in accordance with the flow characteristics.

2. The computer-implemented method of claim 1, further comprising:
    receiving traffic associated with a content session established between a client device and a content provider;
    receiving a result of classifying the traffic according to required flow characteristics received from the client device; and
    routing the classified traffic over a selected one of the one or more tunnels having the required flow characteristics.

3. The computer-implemented method of claim 1, wherein the first request message includes a port control protocol (PCP) proxy probe message.

4. The computer-implemented method of claim 1, wherein the first server is a port control protocol (PCP) server.

5. The computer-implemented method of claim 1, wherein the tunnel identifier is an Internet Protocol Security (IPsec) Security Parameter Index (SPI).

6. The computer-implemented method of claim 1, wherein the first network controller includes a software-defined networking (SDN) controller.

7. The computer-implemented method of claim 1, wherein the first network controller is configured to apply the quality of service policy within the first access network for each tunnel by configuring one or more network devices within the first access network to apply the QoS policy for each tunnel.

8. The computer-implemented method of claim 7, wherein the one or more network devices includes at least one of a router and a switch.

9. The computer-implemented method of claim 1, wherein the first request message is sent by at least one of a proxy within the first access network and a client device connected to the first network.

10. The computer-implemented method of claim 1, wherein the first access network is a Wi-Fi access network.

11. The computer-implemented method of claim 1, further comprising:
    sending a second request message to a second server associated with a second access network, the second request message indicative of a request for an indication of whether the second server is configured to support prioritization of tunneled traffic;
    receiving a second response message from the second server, the second response message indicative of whether the second server is configured to support prioritization of tunneled traffic; and
    establishing one or more second tunnels with the security service when the second response message is indicative that the second server is configured to support prioritization of tunneled traffic, each second tunnel having priority information associated therewith.

12. The computer-implemented method of claim 11, further comprising:
    sending second flow characteristics and a second tunnel identifier for each second tunnel through the second server; and receiving the second flow characteristics for each second tunnel from the second server at a second network controller, the second network controller configured to apply a quality of service (QoS) policy within the second access network for each second tunnel in accordance with the flow characteristics.

13. The computer-implemented method of claim 11, wherein the one or more second tunnels are established using a Mobility and Multihoming (MOBIKE) Protocol using Internet Key Exchange (IKE).

14. The computer-implemented method of claim 11, wherein the second access network includes a mobile network.

15. A system, comprising:
at least one processor; and
memory including instructions that, when executed by the at least one processor, cause the system to:
send a first request message to a first server associated with a first access network, the first request message indicative of a request for an indication of whether the first server is configured to support prioritization of tunneled traffic;
receive a first response message from the first server, the first response message indicative of whether the first server is configured to support prioritization of tunneled traffic;
establish one or more tunnels with a security service when the first response message is indicative that the first server is configured to support prioritization of tunneled traffic, each first access network tunnel having priority information associated therewith;
send first flow characteristics and a first tunnel identifier for each first tunnel to the first server; and
receive the first flow characteristics for each first tunnel from the first server at a first network controller, the first network controller configured to apply a quality of service (QoS) policy within the first access network for each tunnel in accordance with the flow characteristics.

16. The system of claim 15, wherein the at least one processor is further configured to:
receive traffic associated with a content session established between a client device and a content provider;
receiving a result of classify the traffic according to required flow characteristics received from the client device; and
route the classified traffic over a selected one of the one or more tunnels having the required flow characteristics.

17. The system of claim 15, wherein the first request message includes a port control protocol (PCP) proxy probe message.

18. The system of claim 15, wherein the first server is a port control protocol (PCP) server.

19. The system of claim 15, wherein the tunnel identifier is an Internet Protocol Security (IPsec) Security Parameter Index (SPI).

20. The system of claim 15, wherein the first network controller includes a software-defined networking (SDN) controller.

21. The system of claim 20, wherein the first network controller is configured to apply the quality of service policy within the first access network for each tunnel by configuring one or more network devices within the first access network to apply the QoS policy for each tunnel.

22. The system of claim 15, wherein the at least one processor is further configured to:
send a second request message to a second server associated with a second access network, the second request message indicative of a request for an indication of whether the second server is configured to support prioritization of tunneled traffic;
receive a second response message from the second server, the second response message indicative of whether the second server is configured to support prioritization of tunneled traffic; and
establish one or more second tunnels with the security service when the second response message is indicative that the second server is configured to support prioritization of tunneled traffic, each second tunnel having priority information associated therewith.

23. The system of claim 22, wherein the at least one processor is further configured to:
send second flow characteristics and a second tunnel identifier for each second tunnel to the second server; and
receive the second flow characteristics for each second tunnel from the second server at a second network controller, the second network controller configured to apply a quality of service (QoS) policy within the second access network for each second tunnel in accordance with the flow characteristics.

* * * * *